Patented June 22, 1926.

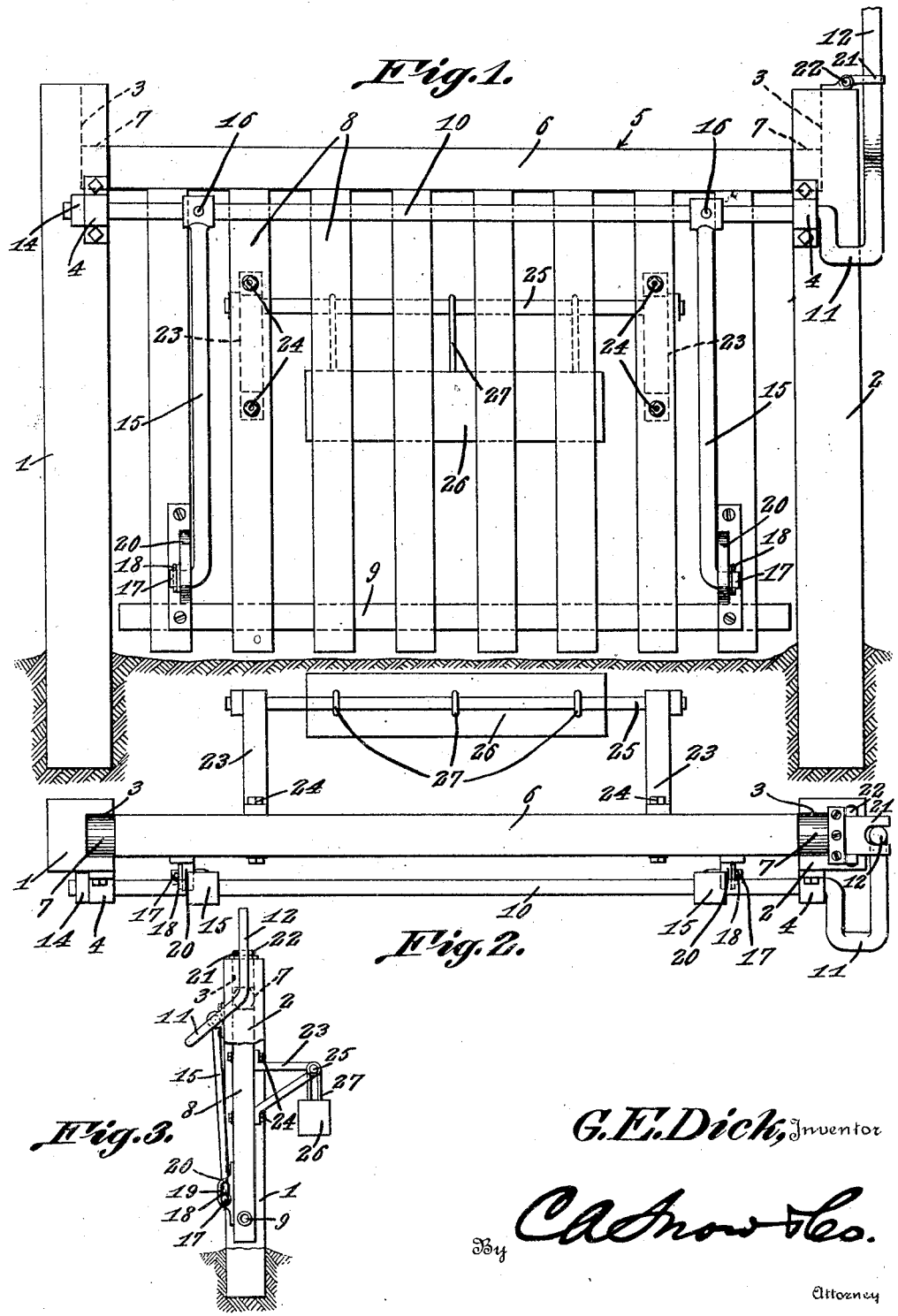

1,589,844

UNITED STATES PATENT OFFICE.

GUY E. DICK, OF DELPHI, INDIANA, ASSIGNOR OF ONE-HALF TO CHARLES J. WEAVER, OF DELPHI, INDIANA.

FLOOD GATE.

Application filed May 3, 1923. Serial No. 636,403.

The device forming the subject matter of this application is a flood gate adapted to be used in the bed of a stream, and the invention aims to provide novel means for mounting, operating and controlling the gate.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention; Figure 2 is a top plan; Figure 3 is an end elevation wherein parts are broken away.

In carrying out the invention, there is provided a support, which may include posts 1 and 2, the posts being supplied at their upper ends with bearing seats 3 which extend part way through the posts transversely. Adjacent to their upper ends, the posts 1 and 2 are supplied with bearings 4.

The numeral 5 designates a gate including a top bar 6 provided at its ends with trunnions 7, mounted to rock in the seats 3 of the posts 1 and 2. Slats 8 are mounted at their upper ends on the top bar 6, the bottom bar 9 being assembled with the slats. Briefly stated, the gate 5 is mounted at its upper end on the posts 1 and 2 for vertical swinging movement.

A shaft 10 is mounted to rock in the bearings 4. At one end, the shaft 10 is supplied with a U-shaped crank 11 terminating in a handle 12 of any desired length. The crank 11 cooperating with one of the bearings 4 prevents the shaft 10 from moving endwise in one direction, endwise movement of the shaft 10 in an opposite direction being prevented by a collar 14 on the shaft, the collar coacting with the adjacent bearing 4. Depending arms 15 are secured at 16 to the shaft 10 and are provided at their lower ends with outstanding fingers 17, held by cotter pins 18, or the like in elongated slots 19, formed in brackets 20 secured to certain of the slats 8 of the gate. Any suitable means may be provided for preventing the shaft 10 from turning in the bearings 4. Thus, if desired a U-shaped latch 21 may be hinged at 22 to the top of the post 2, the handle 12 being adapted to be received in the latch, as shown in Figures 2 and 1, and it being possible to turn the latch 21 over on top of the post 2, so as to set the handle 12 free.

The gate carries an off-set extension which may be in the form of a pair of hangers 23 mounted as indicated at 24 on certain of the slots 8, a rod or support 25 being carried by the hangers 23, and a counterpoise weight 26 being suspended at 27 on the rod or support 25.

When it is desired to open the gate, the latch 21 is swung out of engagement with the handle 12, and rotation is imparted to the shaft 10 by way of the handle, the arms 15 on the shaft swinging the gate to an open position, and the weight 26 aiding in the opening of the gate. When the gate is swung to a closed position, the crank or extension 11 on the shaft 10 engages the post 2 and stops the gate in a vertical position, the latch 21 then being swung over into engagement with the handle 12.

The latch 21 may be swung over from the position shown in Figure 1, out of engagement with the handle 12, and, then, the gate will be yieldably hung, the weight 26 giving such an inclination to the gate that the gate will tend to open responsive to the rising of a flood, as the water flows along.

What is claimed is:—

In a device of the class described, posts provided upon their inner sides with bearings which open through the upper ends of the posts, a gate having trunnions mounted to rock in the bearings, a shaft mounted to rock on the posts, an arm rigidly secured to the shaft, means on the gate for receiving a portion of the arm slidably and pivotally, the shaft having a crank arm which extends upwardly along the outside of one post, a latch on said post and cooperating with the crank arm, a weight, and means for mounting the weight on the gate in offset relation thereto, whereby the weight will tend to swing the gate toward an open position for movement responsive to the flowing water, when the latch is disengaged from the crank arm, and whereby the weight will also aid in starting the gate toward an open position when the gate is manipulated by an operator and when the latch is disengaged from the crank arm, the mounting of the weight on the gate serving to aid in holding the trunnions of the gate in the bearing seats.

In testimony that I claim the foregoing as my own, I have hereto affixed my signature.

GUY E. DICK.